Aug. 23, 1927.
I. E. LOBECK
1,640,280
CLOTHES BASKET
Filed Nov. 12. 1926
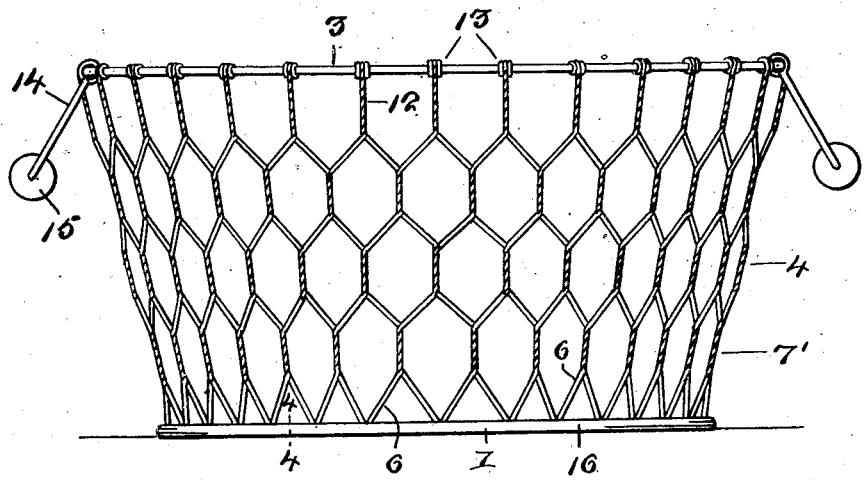
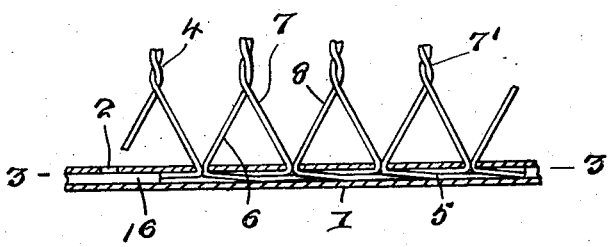
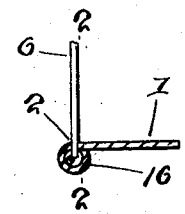
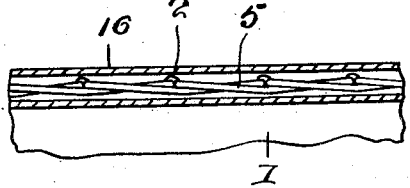
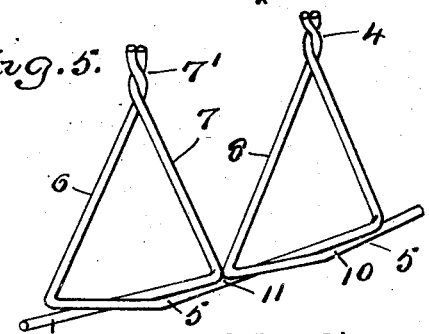
I. E. Lobeck
INVENTOR
BY Victor J. Evans
ATTORNEY Patented Aug. 23, 1927.

1,640,280

UNITED STATES PATENT OFFICE.

INGERINUS E. LOBECK, OF APPAM, NORTH DAKOTA.

CLOTHES BASKET.

Application filed November 12, 1926. Serial No. 148,043.

The object of this invention is the provision of a basket for clothes or for like purposes, which is wholly constructed of metal.

A further object is the construction of a metal basket which includes a base, a rim above the base, and wire strands woven together to provide an open bottom which is connected to both the base and to the rim, the said rim being also provided with handles.

A further object is the provision of a metal basket in which open woven wire strands provide the body thereof and which strands are threaded through the bottom in a novel manner to insure great strength and rigidity and have their upper ends wound or coiled around a rim member that provides the top of the basket.

To the attainment of the above broadly recited objects, the improvement resides in certain novel features of construction, combination and operative association of parts, a satisfactory embodiment of which is disclosed by the accompanying drawings.

In the drawings:

Figure 1 is a side elevation of a basket in accordance with this invention.

Figure 2 is a detail longitudinal sectional view approximately on the line 2—2 of Figure 4.

Figure 3 is a sectional view approximately on the line 3—3 of Figure 2.

Figure 4 is a sectional view approximately on the line 4—4 of Figure 1.

Figure 5 is a fragmentary perspective view to more clearly illustrate the manner in which the wire strands that constitute the body are shaped and associated.

The improvement comprises a metal bottom 1. The bottom may be of any desired shape, but preferably is of elliptical formation, or at least has its ends rounded. The bottom 1, adjacent to its perimeter, is provided with equidistantly spaced pairs of openings 2.

The top of the basket comprises an endless rim 3, and the body 4 of the basket is made up of wire strands. Each wire strand is bent upon itself at a suitable predetermined distance from the center thereof, to provide what I will term the base 5 of the strands. The base portion 5 is inclined at opposite angles from the center thereof, and the limbs 6 of the strands which extend from the ends of the base pass through alternating openings 2. The limbs 6 are bent angularly toward each other, and are twisted, as at 7, around the limbs of similar strands. Thus the oppositely disposed lower angle portions 7 and 8 of the limbs on the base portions 9 and 10 of the strands that are intermediate the limbs 6 of the first mentioned strand enter the opening 2 in the bottom 1 opposite which the central or apex portion 11 of the base 5 of the first mentioned strand is arranged. The strands constituting the body are further bent at opposite angles and from thence brought together and twisted to provide the open body disclosed by Figure 1 of the drawings, while the cooperating pairs of strands have the ends of their upper twisted portions 12 coiled around the rim 3, as indicated by the numerals 13. In this manner it will be noted that a comparatively simple, cheap but very strong and endurable basket is produced. The ends of the rim 3 have secured thereto the bails 14 provided with revoluble handle members 15.

After the base or connecting portions of the strands have been passed through the openings in the bottom 1, the metal outward of the openings 2 is rounded downwardly and inwardly to provide the base with the peripheral hollow bead 16.

The simplicity of my construction and the advantages thereof will, it is thought, be perfectly apparent to those skilled in the art to which such invention relates.

Having described the invention, I claim:—

A basket including a rim top, a metal bottom which is provided with equidistantly spaced apertures adjacent its perimeter, and a body made up of wire strands, each of said strands being bent at points equidistant from the center thereof, and the said center being disposed at opposite angles and providing a base and the limbs extending from the base passing through alternate apertures in the bottom, said limbs having their lower portions inclined inwardly and twisted upon the limbs of the intermediate and cooperating limbs of the adjacent strands and from thence such twisted limbs being further bent angularly and twisted to provide an open weave, and the twisted strands at the upper ends of the basket being wound around the rim.

In testimony whereof I affix my signature.

INGERINUS E. LOBECK.